(12) United States Patent
Bovington (10) Patent No.: US 11,668,886 B2
(45) Date of Patent: *Jun. 6, 2023

(54) LASER AND PHOTONIC CHIP INTEGRATION

(71) Applicant: Cisco Technology, Inc., San Jose, CA (US)

(72) Inventor: Jock T. Bovington, La Mesa, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/454,918

(22) Filed: Nov. 15, 2021

(65) Prior Publication Data

US 2022/0075131 A1    Mar. 10, 2022

Related U.S. Application Data

(63) Continuation of application No. 16/885,433, filed on May 28, 2020, now Pat. No. 11,226,457.

(51) Int. Cl.
*G02B 6/42* (2006.01)
*G02B 6/12* (2006.01)

(52) U.S. Cl.
CPC ............ *G02B 6/4245* (2013.01); *G02B 6/42* (2013.01); *G02B 2006/12121* (2013.01)

(58) Field of Classification Search
CPC .................................................. G02B 6/4245
See application file for complete search history.

(56) References Cited

U.S. PATENT DOCUMENTS

| 5,721,797 A | * | 2/1998 | Basavanhally | ...... G02B 6/4238 385/14 |
| 10,168,497 B2 | * | 1/2019 | Merget | .................. G02B 6/423 |
| 11,239,631 B2 | * | 2/2022 | Barwicz | .................... H01S 5/22 |

FOREIGN PATENT DOCUMENTS

CA    1278910 C    *    1/1991    ........... G02B 6/3803

* cited by examiner

*Primary Examiner* — Charlie Y Peng
(74) *Attorney, Agent, or Firm* — Patterson + Sheridan, LLP (57) ABSTRACT

Embodiments herein describe optical assemblies that use a spacer element to attach and align a laser to a waveguide in a photonic chip. Once aligned, the laser can transfer optical signals into the photonic chip which can then perform an optical function such as modulation, filtering, amplification, and the like. In one embodiment, the spacer element is a separate part (e.g., a glass or semiconductor block) that is attached between the photonic chip and a submount on which the laser is mounted. The spacer establishes a separation distance between the photonic chip and the submount which in turn aligns the laser with the waveguide in the photonic chip. In another embodiment, rather than the spacer element being a separate part, the spacer element may be integrated into the submount.

20 Claims, 12 Drawing Sheets

LASER AND PHOTONIC CHIP INTEGRATION

CROSS-REFERENCE TO RELATED APPLICATIONS

This application is a continuation of co-pending U.S. patent application Ser. No. 16/885,433 filed May 28, 2020. The aforementioned related patent application is herein incorporated by reference in its entirety.

TECHNICAL FIELD

Embodiments presented in this disclosure generally relate to aligning a laser with a photonic chip, and more specifically, to using one or more spacers to align the laser with a waveguide in the photonic chip.

BACKGROUND

Transceivers or other electrical circuitry having integrated optical components, e.g., a transmit optical subassembly (TOSA) of a transceiver, generally require assembly and attachment of the various components such as a laser component with electrical and photonics chips. Arranging the individual components to have a small collective footprint can provide several benefits such as electrical power savings, improved performance, and a reduced package size.

To minimize the footprint, it may be ideal to attach the laser component and electrical chip onto the same photonic chip using direct solder connections. However, in some cases a direct solder attachment is not feasible, e.g., due to varying temperature requirements for different solders and the potential for contaminating the laser component through reflow and cleaning processes.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

One embodiment presented in this disclosure is an optical assembly that includes a photonic chip comprising at least one waveguide, a submount on which a laser is mounted, where the photonic chip includes an etched facet creating a cavity in the photonic chip and the laser is disposed within the cavity. Moreover, the cavity includes at least one pillar extending in a direction towards the laser and the submount, where the laser includes at least one receptacle that mates with the at least one pillar. Further, the laser is edge coupled to the photonic chip and optically aligned with the at least one waveguide.

Another embodiment described herein is an optical assembly that includes a photonic chip comprising at least one waveguide, a submount on which a laser is mounted where the photonic chip defines a cavity in which the photonic chip is disposed and the at least one waveguide terminates proximate to an etched facet of the cavity. Moreover, the cavity comprises at least one pillar extending in a direction towards the laser and the submount and the laser comprises at least one receptacle that mates with the at least one pillar. Further, the laser is edge coupled to the photonic chip and optically aligned with the at least one waveguide.

Another embodiment described herein is a method that includes attaching a laser to a first side of a submount, electrically connecting the laser to power rails on the submount, and attaching the submount to a photonic chip using at least one pillar in a cavity defined by the photonic chip where the laser includes at least one receptacle that mates with the at least one pillar and the laser is edge coupled to the photonic chip and optically aligned with at least one waveguide in the photonic chip.

Example Embodiments

Embodiments herein describe optical assemblies that use spacers to attach and align a laser to a waveguide in a photonic chip. Once aligned, the laser can transfer optical signals into the photonic chip which can then perform an optical function such as modulation, filtering, amplification, and the like. In one embodiment, the spacer is a separate part (e.g., a glass or semiconductor block) that is attached between the photonic chip and a submount on which the laser is mounted. The spacer establishes a separation distance between the photonic chip and the submount which in turn aligns the laser with the waveguide in the photonic chip. That is, the thickness of the spacer can be tightly controlled so that mounting the spacer between the photonic chip and the submount aligns the laser with the waveguide in the photonic chip.

In another embodiment, rather than the spacer being a separate part, the spacer may be integrated into the submount. That is, the submount can have a spacer portion which extends towards the photonic chip. The thickness of the spacer portion can align the laser with the photonic chip when the spacer portion is attached to the photonic chip.

Using a spacer element (e.g., a separate spacer or a spacer portion integrated into the submount) can reduce the size of a cavity which is formed into the photonic chip in order to edge couple the laser with the photonic chip. That is, without the spacer, the cavity may have to be hundreds of microns deep which may require a special etch tool to form. In contrast, using a spacer can reduce the cavity to less than 10 microns deep which can be formed using any number of different etch techniques. Thus, the embodiments herein can greatly reduce the cost and complexity of forming a photonic chip that can be edge coupled to a laser.

Figure 1:
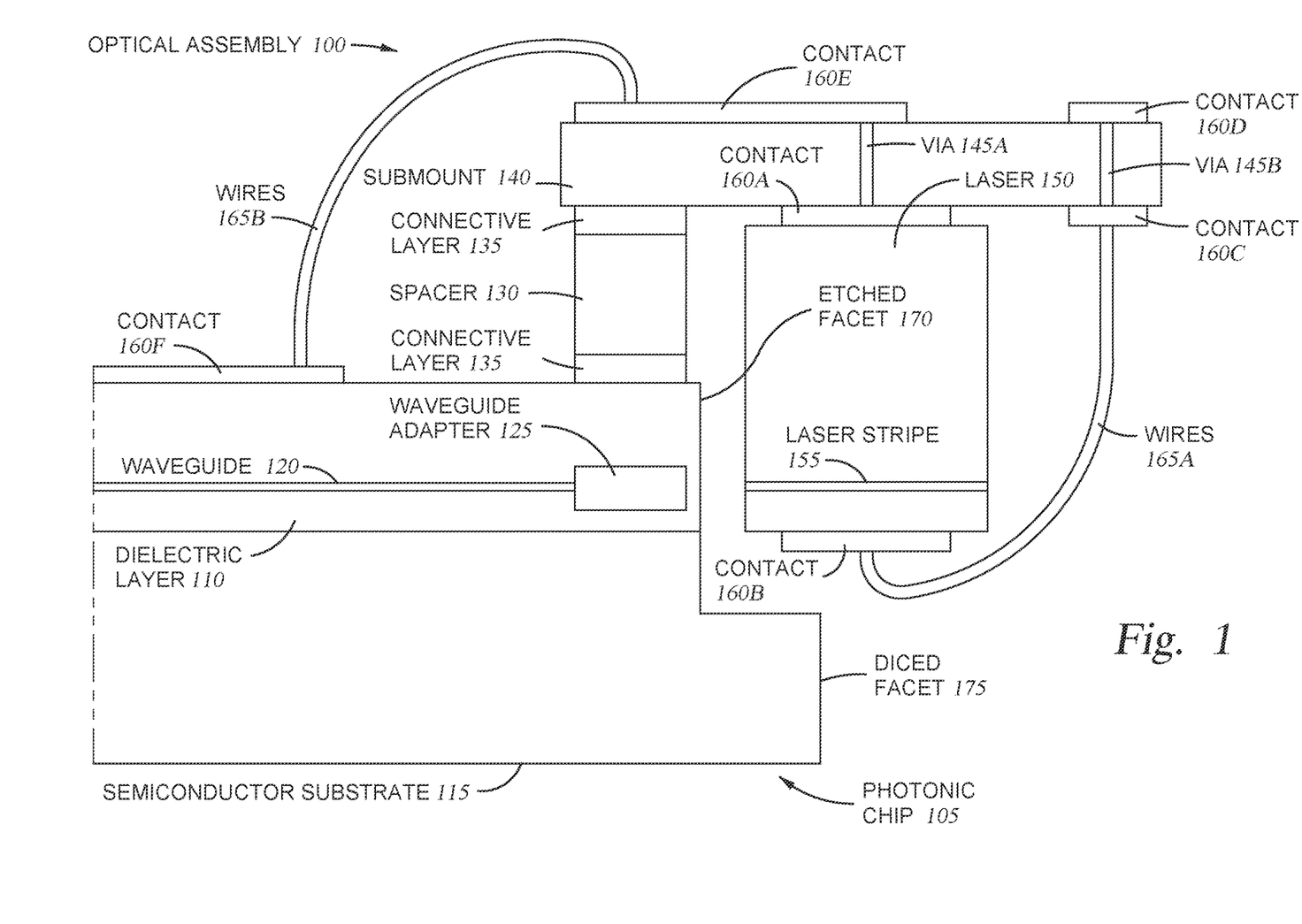
FIG. 1 illustrates an optical assembly that includes at least one spacer for aligning a laser to a photonic chip, according to one embodiment.

FIG. 1 illustrates an optical assembly 100 that includes at least one spacer 130 for aligning a laser 150 to a photonic chip 105, according to one embodiment. Specifically, FIG. 1 is a cross sectional side view of the optical assembly 100. The photonic chip 105 includes a dielectric layer 110 (e.g., silicon dioxide or other suitable cladding) that contains a waveguide 120 optically coupled to a waveguide adapter 125. The waveguide adapter 125 can include any suitable structure (e.g., a prong structure formed from multiple waveguides, one or more tapering waveguides, and the like) for improving the optical coupling efficiency between the photonic chip 105 and the laser 150. In one embodiment, the waveguide adapter 125 changes a mode size of the optical signal emitted by the laser 150 to better match a size of the waveguide 120, which may be a sub-micron waveguide. However, the waveguide adapter 125 is not necessary and the laser 150 can be directly optically coupled with the waveguide 120.

Although not shown, the waveguide 120 can transfer the optical signal received from the laser 150 to an optical component in the photonic chip 105 such as an optical modulator, optical amplifier, optical filter, and the like. The photonic chip 105 may then transmit the modified optical signal to a different optical component, such as transmit the modified optical signal to an optical fiber. In one embodiment, the optical assembly 100 may be part of a transmitter used to encode digital data into the optical signal generated by the laser and then transmit the optical signal to a receiver using an optical fiber.

The photonic chip 105 also includes a semiconductor substrate 115 (e.g., silicon, a III-V semiconductor, or any other suitable semiconductor material) that provides mechanical support to the various optical components formed in the photonic chip 105. The semiconductor substrate 115 may be much thicker than the dielectric layer 110 which is tens of microns while the substrate 115 can be hundreds of microns.

As shown, the photonic chip 105 has been processed to form an etched facet 170 and a diced facet 175. In this embodiment, the etched facet 170 extends through the dielectric layer 110 and a small portion of the semiconductor substrate 115 to from a cavity or recess. The diced facet 175, in contrast, extends through the entire substrate 115. In one embodiment, the height of the etched facet 170 (e.g., in the vertical direction in FIG. 1) is less than 20 microns and can be less than 10 microns. In one embodiment, the height of the etched facet 170 is less than 50 microns. In one embodiment, the height of the etched facet 170 is sufficient to provide clearance for the laser 150 (and any electrical connections to the laser 150) so that the laser 150 can be edge coupled to the photonic chip 105 at the facet 170. The diced facet 175, on the other hand, may extend entirely through the photonic chip 105, and thus, may have a height of hundreds of microns.

The etched facet 170 can be formed using any suitable etching technique. The diced facet 175 can also be formed using an etching technique, but it might be much more cost and time effective to use a dicing or cleaving technique to form the diced facet 175. Further, while FIG. 1 illustrates forming two separate facets in the photonic chip 105, in another embodiment, dicing or cleaving can be used to form one facet that extends through the entire photonic chip 105 at which the laser 150 can be edge coupled to the waveguide adapter 125.

In FIG. 1, the etched facet 170 provides an optical interface that permits the laser 150 and the waveguide adapter 125 and the waveguide 120 to transfer optical signals. In one embodiment, the laser 150 generates a continuous wave (CW) optical signal that is transmitted through the etched facet 170 and into the waveguide adapter 125 and the waveguide 120. In this example, the waveguide adapter 125 is recessed a distance from the etched facet 170 (e.g., the optical interface) although this is not a requirement.

The spacer 130 is used to align, and mount, the laser 150 to the photonic chip 105. A first side or surface of the spacer 130 is attached to a top surface of the photonic chip 105 using one of the connective layers 135, while a second, opposite side or surface of the spacer 130 is attached to a bottom surface of a submount 140 using another one of the connective layers 135. In various embodiments, the connective layers 135 are both epoxy layers, or the connective layers 135 both include solder bumps, or one of the connective layers 135 includes solder bumps and the other is epoxy. The spacer 130 provides a mechanical connection between the submount 140 and the photonic chip 105. As discussed below, the optical assembly 100 may include multiple spacers 130 for attaching the submount 140 to the photonic chip 105. In one embodiment, the spacer(s) 130 may be the only part(s) that provide mechanical support between the photonic chip 105 and the submount 140, however in other embodiments different components can also be used to attach the submount 140 to the photonic chip 105.

The spacer 130 may be formed from any material that can be used to align the laser 150 to the photonic chip 105. In one embodiment, the material of the spacer 130 does not expand or contract (or only slightly expands or contracts) as environmental parameters in which the optical assembly 100 operates change. For example, the thickness of the spacer 130 may not change (or may change only slightly) as the temperature or humidity in the environment the optical assembly 100 operates changes. In one embodiment, the spacer 130 may be formed from silicon or glass, but these are just a few of the suitable materials that can be used for the spacer 130.

The submount 140 provides mechanical support to the laser 150 and, along with the spacer 130, provides a mechanical connection between the laser 150 and the photonic chip 105 so that the laser 150 can be aligned to the waveguide adapter 125 in the photonic chip 105. In addition to providing mechanical support, the submount 140 is processed to include electrical connections for powering the laser 150. As shown, the submount 140 includes contacts 160C-E and vias 145A-B that can transfer electrical power to the laser 150. In this embodiment, the contact 160E and at least one other contact which is not shown are coupled via wires 165B (which form wire bonds) to a contact 160F and at least one other contact on the photonic chip 105. The contacts on the photonic chip 105 can be coupled to power sources which provide power (e.g., at least two voltages) for powering the laser 150. For example, one voltage is applied to a top side of the laser 150 by the contact 160E, the via 145A, and the contact 160A while another voltage is applied to a bottom side of the laser 150 by the contact 160D, the via 145B, the contact 160C, wires 165A (which form wire bonds), and a contact 160B. In this example, the contact 160B is disposed on a side of the laser 150 that has a facing relationship with the photonic chip 105, or more specifically, with the semiconductor substrate 115 of the photonic chip 105.

The electrical components in the submount 140 can be implemented using many different techniques to route power from the top surface of the submount 140 to its bottom surface on which the laser 150 is attached. As shown, the submount 140 uses the vias 145 to connect electrical contacts on its top surface to its bottom surface. However, in another embodiment, the submount 140 can include "wrap around" contacts that extend from the top surface, around a side surface, and onto the bottom surface in order to power the laser 150 using the contact 160A and the wires 165A. In yet another embodiment, the submount 140 can use castellations formed on one or more sides of the submount 140 to transfer electrical signals from its top surface to its bottom surface. In one embodiment, the castellations have half-moon shapes (when viewed from the top) that can either be filled with conductive material, or can simply be plated with conductive material to provide electrical connections between the top and bottom surfaces of the submount 140.

In one embodiment, the laser 150 includes a diode (e.g., a P side and an N side) where the power provided by the submount 140 forward-biases the diode in order to generate an optical signal in a laser stripe 155. This optical signal is then transmitted into the waveguide adapter 125 as discussed above. In one embodiment, the P side of the laser 150 is bonded to the submount 140 rather than the N side. Thus, the laser 150 can be attached to the submount 140 junction side up using solder.

The thickness of the laser 150, and the location of the laser stripe 155 within the laser 150, may determine the thickness of the spacer 130. Stated differently, the thickness of the spacer 130 may be set such that an output of the laser stripe 155 aligns with an input of the waveguide adapter 125. In FIG. 1, the laser 150 is mounted on a same side of the submount 140 as the spacer 130. Thus, the thickness of the spacer 130 determines a separation distance between the submount 140 and the photonic chip 105 which in turn determines the alignment of laser stripe 155 and the waveguide adapter 125 in the vertical direction. The thickness of the spacer 130 can be tightly controlled to provide a sub-micron tolerance, where the thickness of the spacer 130 varies less than +/−one micron. Further, the thicknesses of the connective layers 135 (e.g., epoxy, solder, etc.) can also be tightly controller to facilitate alignment.

In one embodiment, the thickness of the laser 150 can range from 100-150 microns. In that case, the thickness of the spacer 130 can range from 70-130 microns. However, the thickness of the laser 150, and thus, the thickness of the spacer 130 are not limited to these ranges. The arrangement shown in FIG. 1 can be adjusted to suit other types of laser 150 with different sizes.

Further, the etched facet 170 (and the cavity it forms) provides sufficient clearance so that a bottom surface of the laser 150 can extend below the top surface of the photonic chip such that the laser 150 is edge coupled to the photonic chip 105. Advantageously, the height of the etched facet 170 can be small—e.g., less than 50 microns, less than 20 microns, or less than 10 microns—which can be formed using many standard front-of-the-line processes when fabricating the photonic chip 105. In contrast, other edge coupling solutions (that do not use the spacer 130) require a deep etch (e.g., hundreds of microns) into the photonic chip 105 to provide clearance for the laser 150 which cannot be done using standard front-of-the-line processes and fabrication tools (e.g., a deep reactive ion etch).

Figure 2:
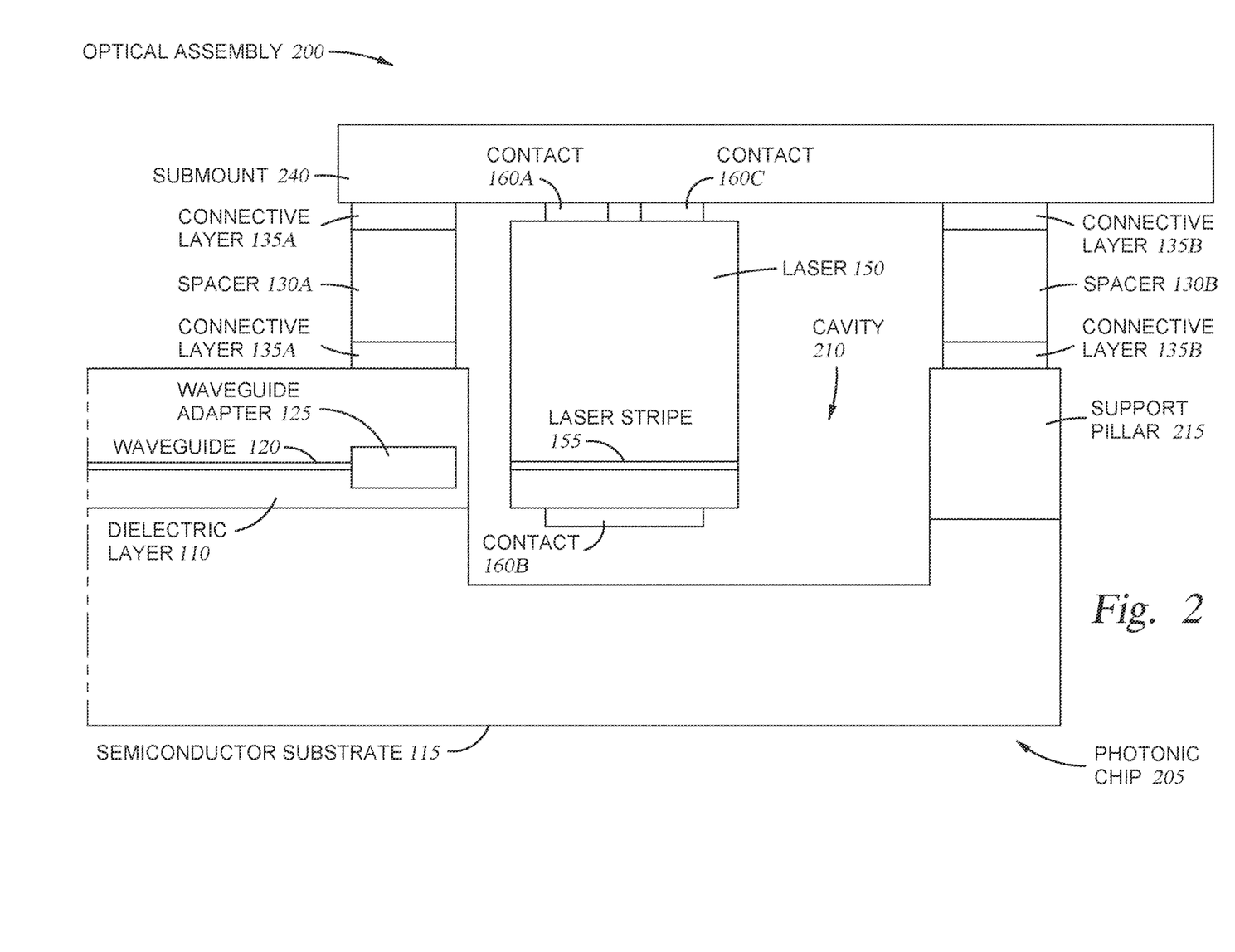
FIG. 2 illustrates an optical assembly that includes multiple spacers for aligning a laser to a photonic chip, according to one embodiment.

FIG. 2 illustrates an optical assembly 200 that includes multiple spacers 130A-B for aligning the laser 150 to a photonic chip 205, according to one embodiment. Specifically, FIG. 2 is a cross sectional side view of the optical assembly 200. While FIG. 1 illustrates an optical assembly 100 where only one spacer 130 is used to align the laser 150 to a photonic chip 105, FIG. 2 illustrates an optical assembly 200 where at least two (and possibly more) spacers 130 are used to align the laser 150 to a photonic chip 205. As shown, the photonic chip 205 in FIG. 2 is different from the photonic chip 105 in FIG. 1. In FIG. 2, the photonic chip 205 has been processed to form a different shaped cavity 210 that extends through the dielectric layer 110 and a portion of the semiconductor substrate 115. The cavity 210 can be formed using the same etching step that was used to form the etched facet 170 in FIG. 1. However, instead of dicing or cleaving the photonic chip 205 a slight distance to the right of the waveguide adapter 125 (like what was done to the photonic chip 105 in FIG. 1 to form the diced facet 175), the photonic chip 205 may be diced or cleaved to the right of the cavity 210 such that a support pillar 215 is formed. Thus, the photonic chip 205 extends to the right of the laser 150 to form the cavity 210 which provides clearance for the laser 150 and to form the support pillar 215 on which another spacer 130B can be attached.

In one embodiment, the top surface of the photonic chip 205 above the waveguide 120 and the waveguide adapter 125 is coplanar with the top surface of the support pillar 215. That way, the spacers 130A and 130B are mounted on the same plane (assuming the thickness of the connective layers 135A and 135B are the same). As a result, the top and bottom surfaces of the submount 240 are substantially parallel with the top surface of the photonic chip 205 (assuming the connective layers 135 and the spacers 130 have substantially the same thicknesses relative to each other).

Using multiple spacers 130 may improve the mechanical connection between the submount 240/laser 150 and the photonic chip 205. That is, disposing spacers 130 on opposite sides of the laser 150 and the cavity 210 can decrease the likelihood that the submount 240 will break off from the photonic chip 205—e.g., one of the connective layers 135A fails. Further, using multiple spacers 130 may provide greater stability when aligning the laser 150 to the waveguide adapter 125 during active or passive alignment stages. For example, during active alignment, an alignment machine or technician may press, slide, or rotate the submount 240 relative to the photonic chip 205. Using multiple spacers 130 may provide more stability during this process.

Further, the spacers 130 in FIGS. 1 and 2 may include epoxy wells that aid the spread of epoxy at the connective layers 135. The epoxy wells can include parallel slots or circles etched into the spacers 130 (or the submount 240 and the top surface of the photonic chip 205). In one embodiment, the epoxy wells help to maintain an even thickness of epoxy in the connective layers and provide space so the spacers 130 can be moved when actively aligning the laser 150 to the waveguide adapter 125.

While FIG. 2 illustrates two spacers 130, the optical assembly 200 can include additional spacers. For example, four spacers 130 may be disposed at the corners of the cavity 210. Thus, the embodiments herein are not limited to any particular number of spacers or an arrangement of those spacers around the cavity 210.

It may be difficult to make a wire bond connection from the submount 240 to the contact 160B given the separation distance between the contact 160B and the bottom side of the cavity 210 in the photonic chip 205. Thus, in this embodiment, an electrical contact can be formed between the contact 160B and the contact 160C using a wraparound contact (not shown) on the laser 150 that extends between the contacts 160B and 160C. In one embodiment, the wraparound contact is disposed on an insulator disposed on a vertical side of the laser 150 so that the laser diode is not shorted by the wraparound contact.

Figure 3:
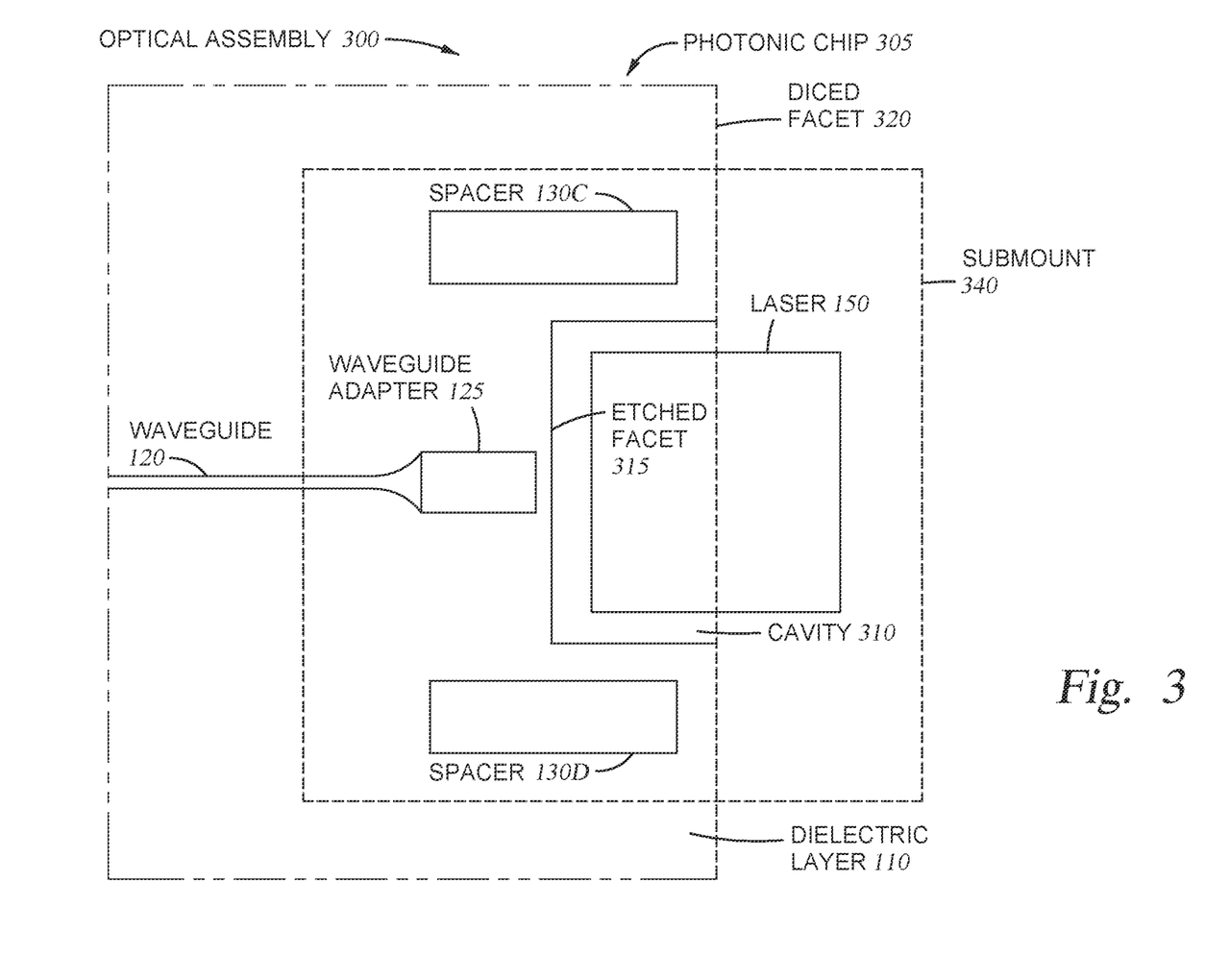
FIG. 3 illustrates an optical assembly that includes multiple spacers for aligning a laser to a photonic chip, according to one embodiment.

FIG. 3 illustrates an optical assembly 300 that includes multiple spacers 130 for aligning the laser 150 to a photonic chip 305, according to one embodiment. Specifically, FIG. 3 is a top view of an optical assembly 300 (rather than the side views provided in FIGS. 1 and 2). For clarity, a submount 340 (on which the laser 150 is mounted) and the photonic chip 305 are shown in phantom so the underlying components, and their arrangement, are visible. That is, FIG. 3 assumes the submount 340 and the photonic chip 305 are transparent so that the laser 150, cavity 310, waveguide adapter 125, and the waveguide 120 are visible.

In FIG. 3, the spacers 130C and 130D are in facing relationship to one another on either side of the cavity 310 formed in part by an etched facet 315. This is in contrast to FIGS. 1 and 2 where the spacers would be disposed on the left and/or right sides of the cavity 310 in FIG. 3. Thus, the combination of FIGS. 1-3 illustrates that the spacers 130 can be disposed on only one side of the laser 150/cavity 210, on a subset of the sides of the laser 150/cavity 210, or on all four sides of the laser 150/cavity 210.

Further, the spacers 130C and 130D in FIG. 3 can have varying lengths (in the horizontal direction). In this example, the spacers 130 have lengths greater than the length of the laser 150, but in other examples may have lengths less than the length of the laser. Further, while spacers 130 are disposed on opposite sides of the laser 150, in another embodiment multiple spacers may be disposed on each side. For example, the spacer 130C may be divided into two or more spacers (and the same for spacer 130D).

Figure 4:
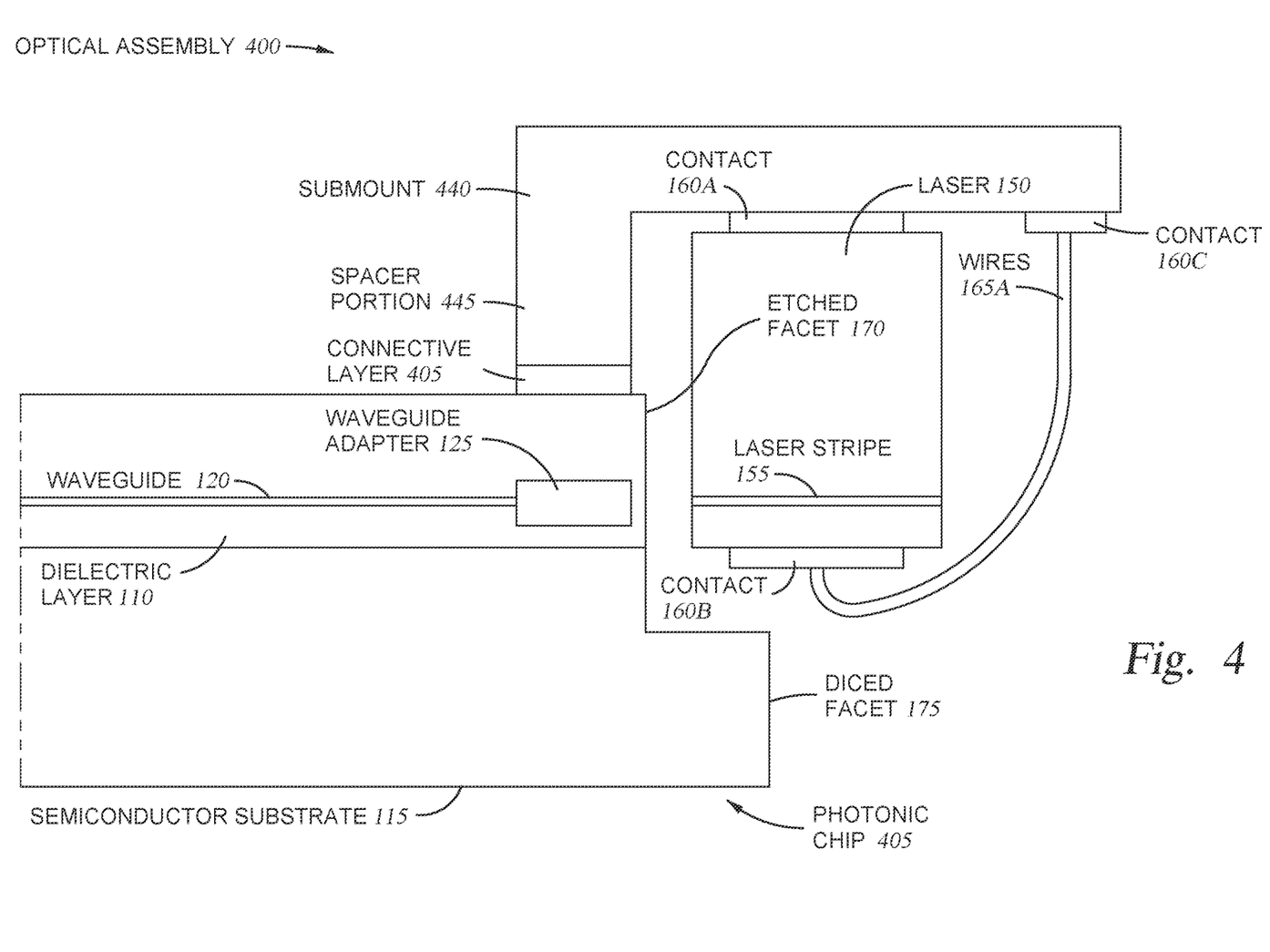
FIG. 4 illustrates an optical assembly that includes a submount with a spacer portion for aligning a laser to a photonic chip, according to one embodiment.

FIG. 4 illustrates an optical assembly 400 that includes a submount 440 with a spacer portion 445 for aligning a laser to a photonic chip, according to one embodiment. Instead of having a separate spacer block as shown in FIGS. 1-3, the submount 440 has the spacer portion 445 (e.g., a step) for connecting and aligning the laser 150 to the photonic chip 105. As shown, the photonic chip 105 can be the same as the photonic chip 105 in FIG. 1, and thus, is not described in detail here.

The optical assembly 400 includes a connective layer 405 (e.g., epoxy, adhesive, solder, etc.) for establishing a mechanical connection between the submount 440 and the photonic chip 105. Like the spacers discussed above, the spacer portion 445 has a controlled thickness such that when the submount 440 is attached to the top surface of the photonic chip 105, the laser 150 is aligned with the waveguide adapter 125 and the waveguide 120. For example, the submount 440 may be processed using one or more etching steps such that the spacer portion 445 extends away from the surface of the submount 440 on which the laser 150 is mounted.

One advantage of using the submount 440 as the spacer is that there is one less connective layer relative to using a separate spacer as discussed above, which may simplify the laser alignment process. However, one disadvantage is that controlling the thickness of the spacer portion 445 of the submount 440 may be more difficult than controlling the thickness of a separate spacer. For example, if the submount 440 is formed from Aluminum Nitride of Silicon, the thickness may have a variance of +/−15 microns which can result in poor alignment between the laser 150 and the waveguide adapter 125.

Figure 5:
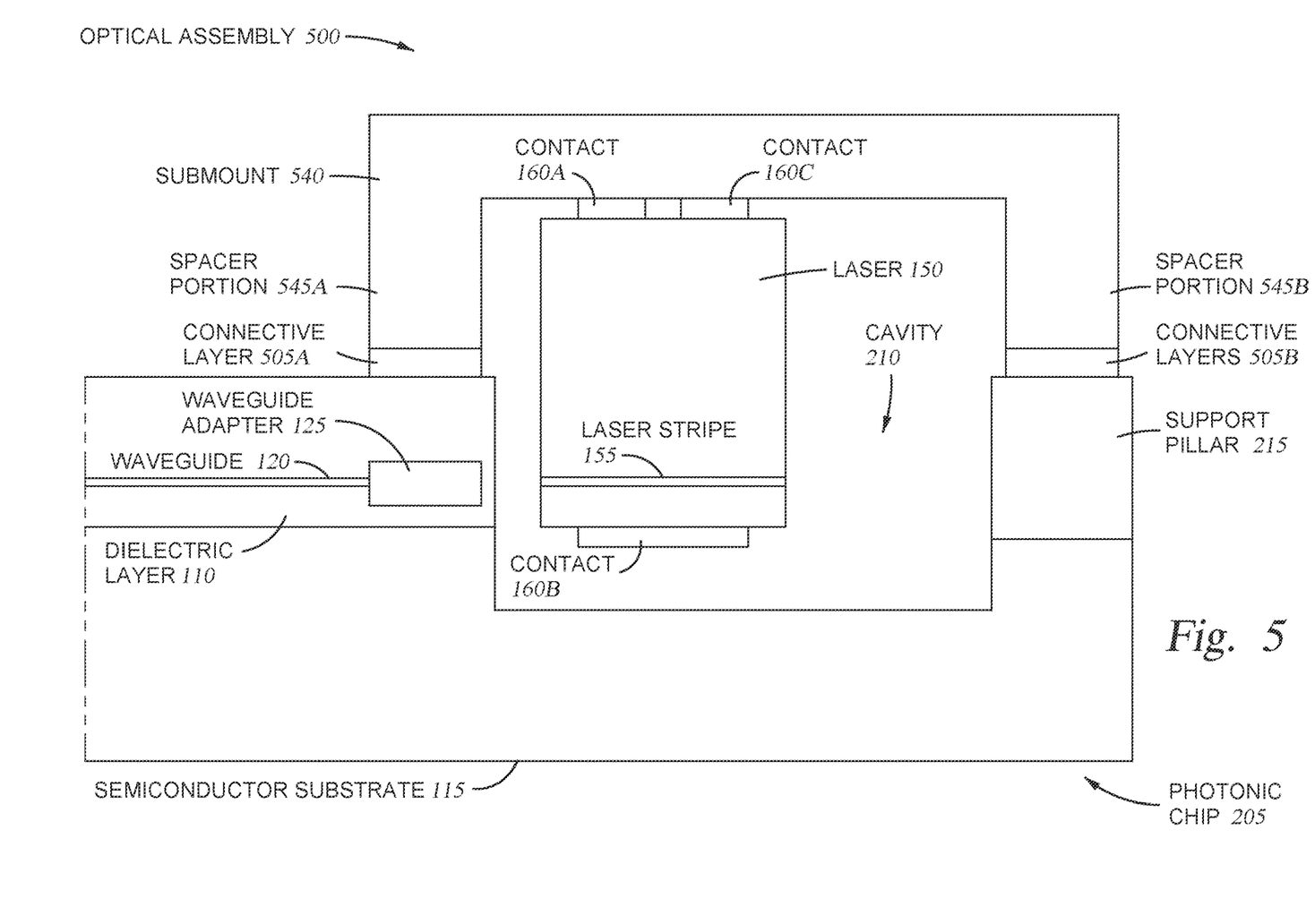
FIG. 5 illustrates an optical assembly that includes at least one spacer for aligning a laser to a photonic chip, according to one embodiment.

FIG. 5 illustrates an optical assembly that includes a submount 540 with multiple spacer portions 545 for aligning a laser to a photonic chip 205, according to one embodiment. The submount 540 can be mounted on the photonic chip 205 similar to the one discussed in FIG. 2 that includes the cavity 210. In this example, the submount 540 includes a spacer portion 545A on one side of the laser 150 (and cavity 210) and a spacer portion 545B on an opposite side of the laser 150 (and cavity 210). Including multiple spacer portions 545 may increase the stability and durability of the mechanical connection between the submount 540 and the photonic chip 205 relative to a submount that only has one spacer portion. Further, including multiple spacer portions 545 may improve the ability of an alignment tool to align the laser 150 to the photonic chip 205, although additional spacer portions 545 may increase the cost of the submount 540.

While FIG. 5 illustrates disposing spacer portions 545 to the left and right of the laser 150 and the cavity 210, in other embodiments, the submount 540 may include spacer portions in front of and behind the laser 150 (in the direction in and out of the page). That is, the submount 540 may include spacer portions in a similar location as the spacers 130C and 130D illustrated in the top view in FIG. 3. The submount 540 can include spacer portions on all four sides of the laser 150, or only a pair of sides. Further, the submount 540 can include multiple spacer portions on one or more sides. Each of these spacer portions 545 can include a connective layer which provides alignment tolerance so that the submount 540 can be moved relative to the photonic chip 205 in order to align the laser 150 to the photonic chip 205. Moreover, the spacer portions 545 can have lengths and widths (e.g., along the left/right directions and in/out of the page) that are less than, equal to, or greater than the length and width of the laser 150.

Similar to FIG. 2, it may be difficult to make a wire bond connection from the submount 540 to the contact 160B given the separation distance between the contact 160B and the bottom side of the cavity 210 in the photonic chip 205. Thus, in this embodiment, an electrical contact can be formed between the contact 160B and the contact 160C using a wraparound contact (not shown) on the laser 150 that extends between the contacts 160B and 160C. In one embodiment, the wraparound contact is disposed on an insulator disposed on a vertical side of the laser 150 so that the laser diode is not shorted by the wraparound contact.

Figure 6:
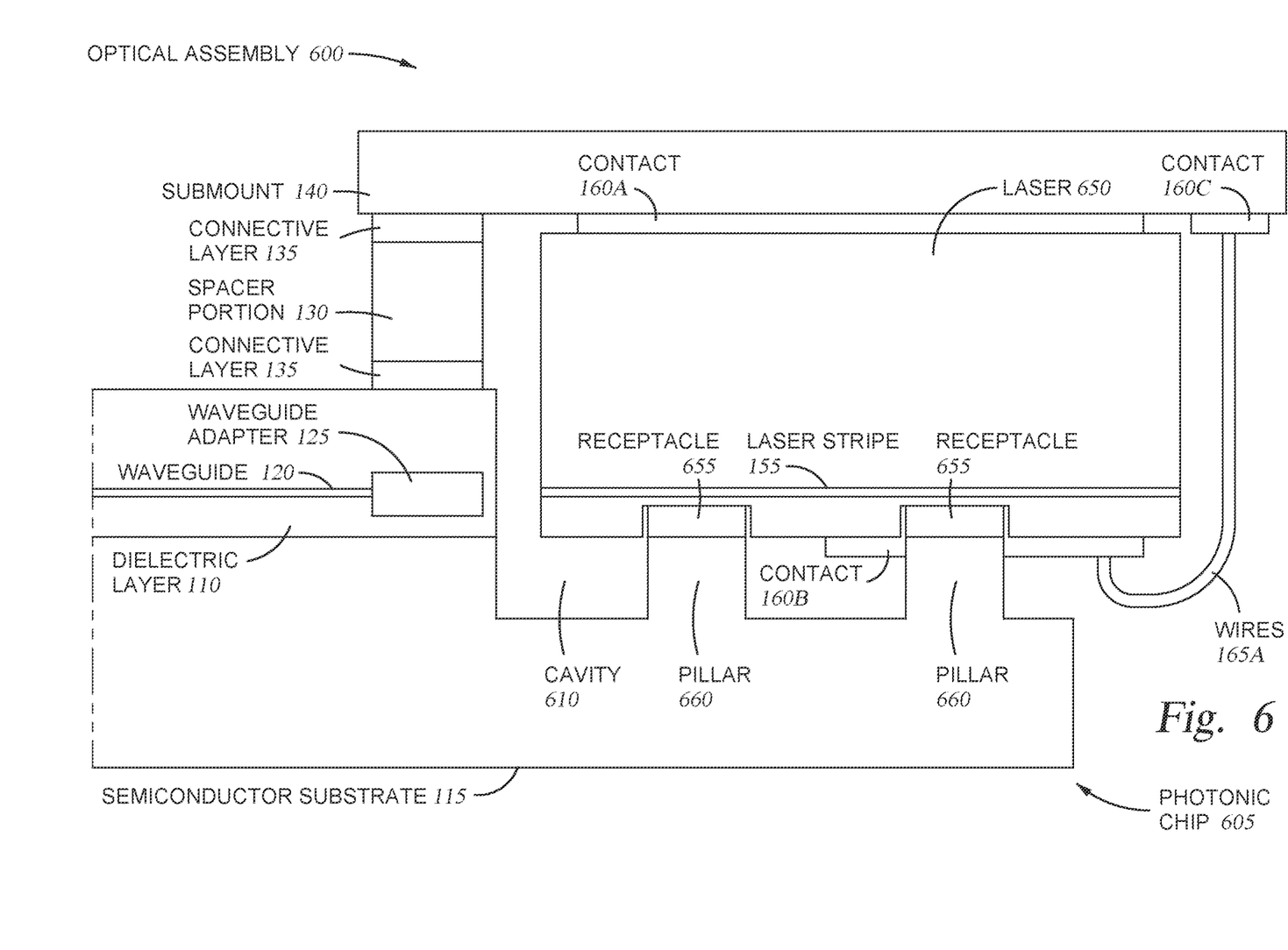
FIG. 6 illustrates an optical assembly that includes at least one spacer for aligning a laser to a photonic chip, according to one embodiment.

FIG. 6 illustrates an optical assembly 600 that includes at least one spacer 130 for aligning a laser 650 to a photonic chip 605, according to one embodiment. In this example, the photonic chip 605 is fabricated to include pillars 660 for supporting and aligning the laser 650. For example, when etching a cavity 610 into the photonic chip 605, the etch can be patterned so that one or more pillars 660 are formed. In one embodiment, the pillars 660 may be formed within the cavity 610. However, in another embodiment, the pillars 660 may be formed on the edges of the cavity 610. That is, the pillars 660 can be standalone features in the cavity 610 or can have one or more sides that are part of a boundary of the cavity 610.

In turn, the laser 650 is processed to include receptacles 655 that mate with the pillars 660 in the photonic chip 605.

That is, the receptacles 655 can define apertures with dimensions that substantially match the dimensions of the pillars 660 so that the pillars can be fitted within the apertures. In this manner, the optical assembly 600 can use the pillars 660 and the receptacles 655 along with the spacer 130 to align the laser 650 to the waveguide adapter 125. In one embodiment, mating the receptacles 655 with the pillars 660 aids to align the laser 650 in six degrees (or six axes) of freedom. These features can be used in active and passive alignment steps.

Further, the receptacles 655 and the pillars 660 can also be used in the other types of optical assemblies discussed above. For example, the receptacles 655 and the pillars 660 can be added to the optical assemblies that include multiples spacers as shown in FIGS. 2 and 3 (rather than just one spacer as shown in FIG. 6). Further, the receptacles 655 and the pillars 660 can be used with the optical assemblies in FIGS. 4 and 5 that include submounts with integrated spacer portions, rather than separate spacers.

Figure 7:
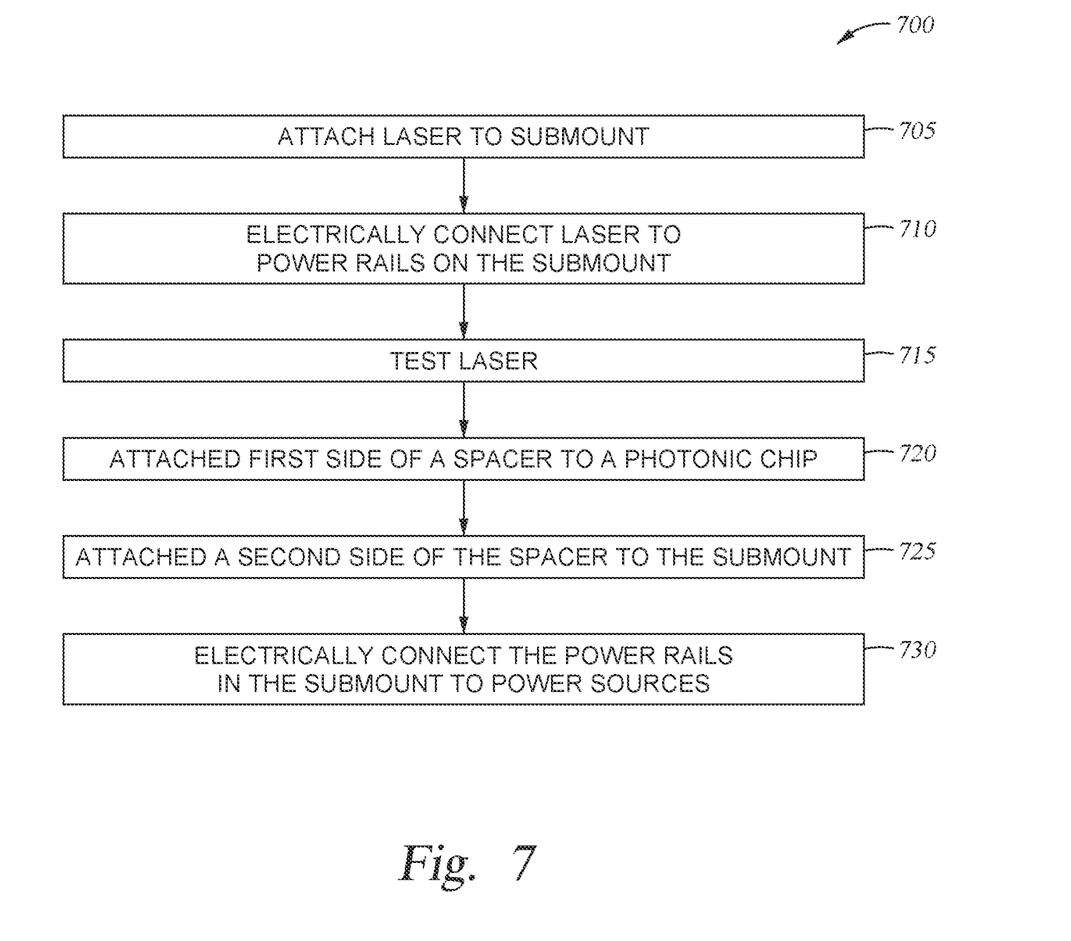
FIG. 7 is a flowchart for aligning a laser to a photonic chip using a spacer, according to one embodiment.

FIG. 7 is a flowchart of a method 700 for aligning a laser to a photonic chip using a spacer, according to one embodiment. For clarity, some of the blocks in the method 700 are discussed in tandem with FIGS. 8A-8E which illustrate fabrication steps corresponding to the flowchart in FIG. 7, according to one embodiment.

Figure 8A:
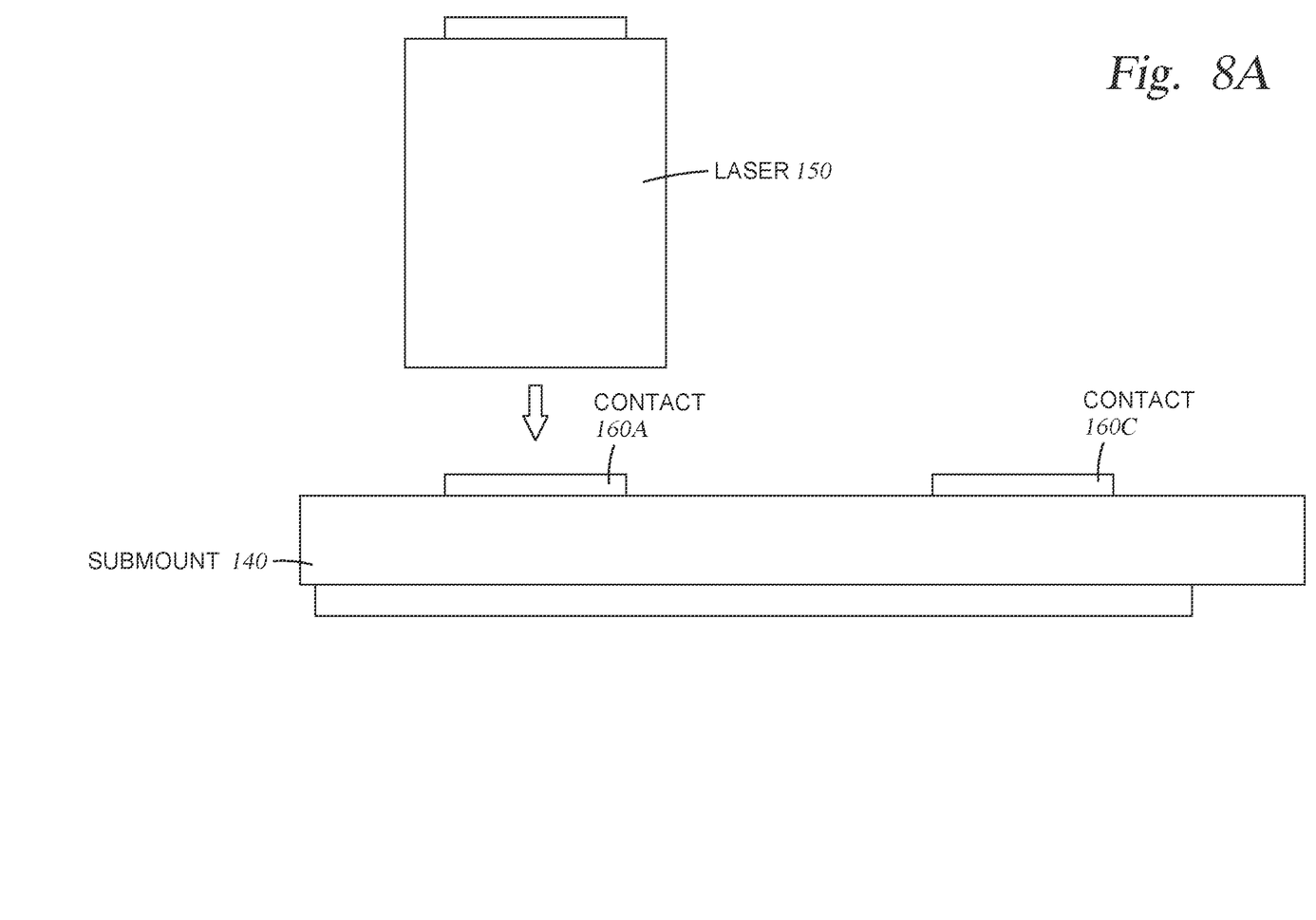
FIGS. 8A-8E illustrate fabrication steps that correspond to the flowchart in FIG. 7, according to one embodiment.

At block 705, a laser is attached to a submount. As shown in FIG. 8A, the laser 150 is attached to the contact 160A of the submount 140. The contacts 160 can be formed from any conductive metal such as gold, tin, or a combination thereof. In one embodiment, the laser 150 is soldered to the contact 160A but any suitable connection technique can be used to electrically, and mechanically, couple the laser 150 to the contact 160A.

Figure 8B:
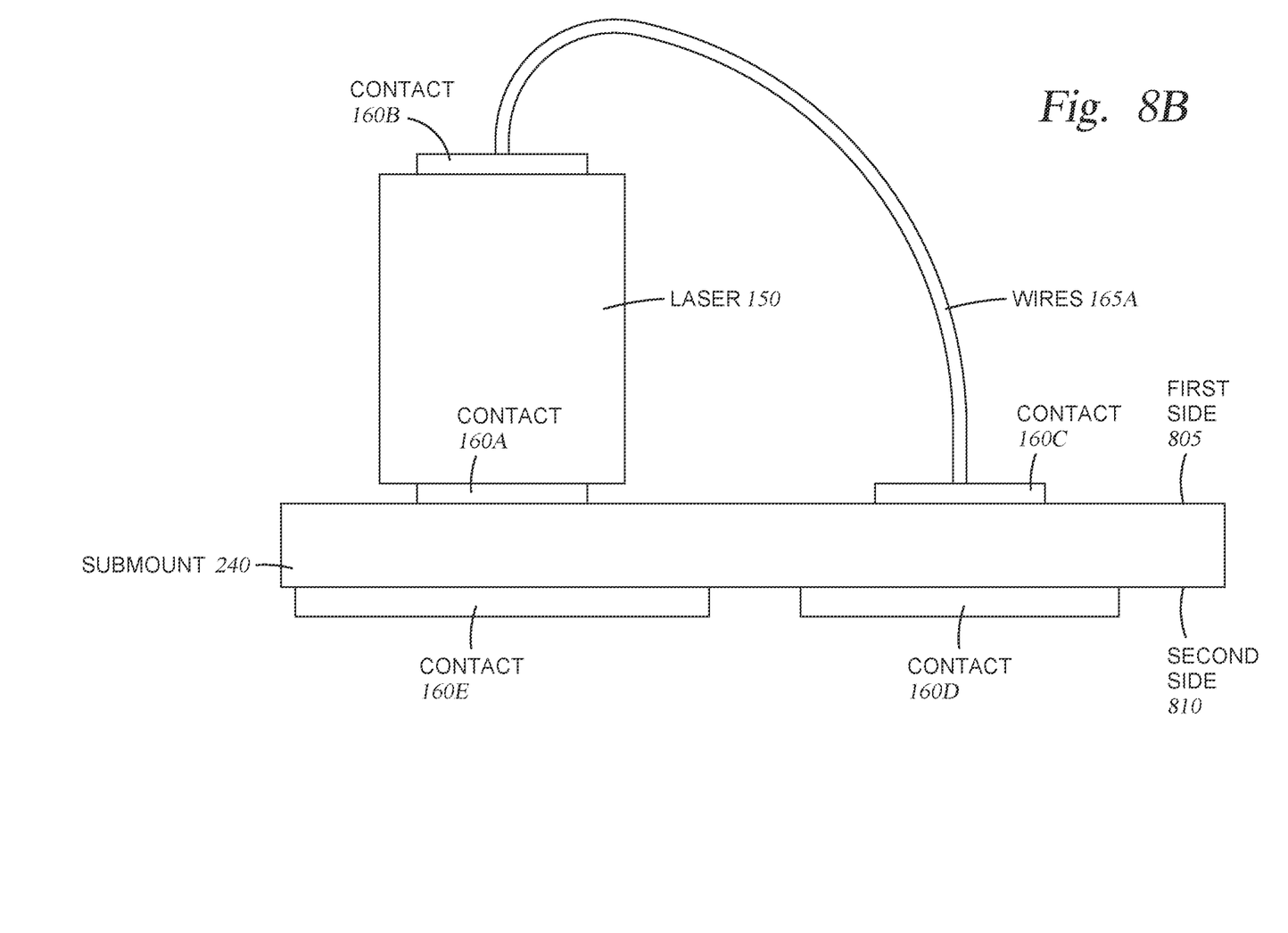

At block 710, the laser is electrically connected to power rails on the submount. As shown in FIG. 8B, the laser 150 is electrically connected to the submount 140 using two contacts: contact 160A and 160B. The electrical connection to the contact 160A is made directly when performing block 705. However, to electrical connect the contact 160B on the opposite side of the laser 150 to the submount 140, the wires 165A are used to form wire bonds between the contact 160B and the contact 160C.

Although not shown in FIG. 8B, the submount 140 includes electrical connections between a first side 805 on which the laser 150 is attached and a second, opposite side 810 of the submount 140. As mentioned above, these electrical connections can include vias that extend through the submount 140, castellations at the edge of the submount 140, or wrap around contacts that extend from the first side 805 to the second side 810. That is, these electrical connections can connect the contacts 160A and 160C to contacts 160D and 160E on the second side 810. The contacts 160D and 160E can serve as power rails to provide power signals (e.g., different voltages) for driving the laser 150.

At block 715, the laser is tested. In one embodiment, the power rails on the submount can be temporarily connected to a testing apparatus using, e.g., test probes, that powers the laser. The testing apparatus can then ensure the laser is functioning properly. Advantageously, being able to test the laser before it is attached to the photonic chip can improve yield and reduce costs since non-functioning lasers can be identified before they are attached to a photonic chip. If a laser is tested after being attached to a photonic chip, then the entire optical assembly (including the photonic chip) may be unusable (or have to be recycled) if the laser is then determined as being non-functional.

Figure 8C:
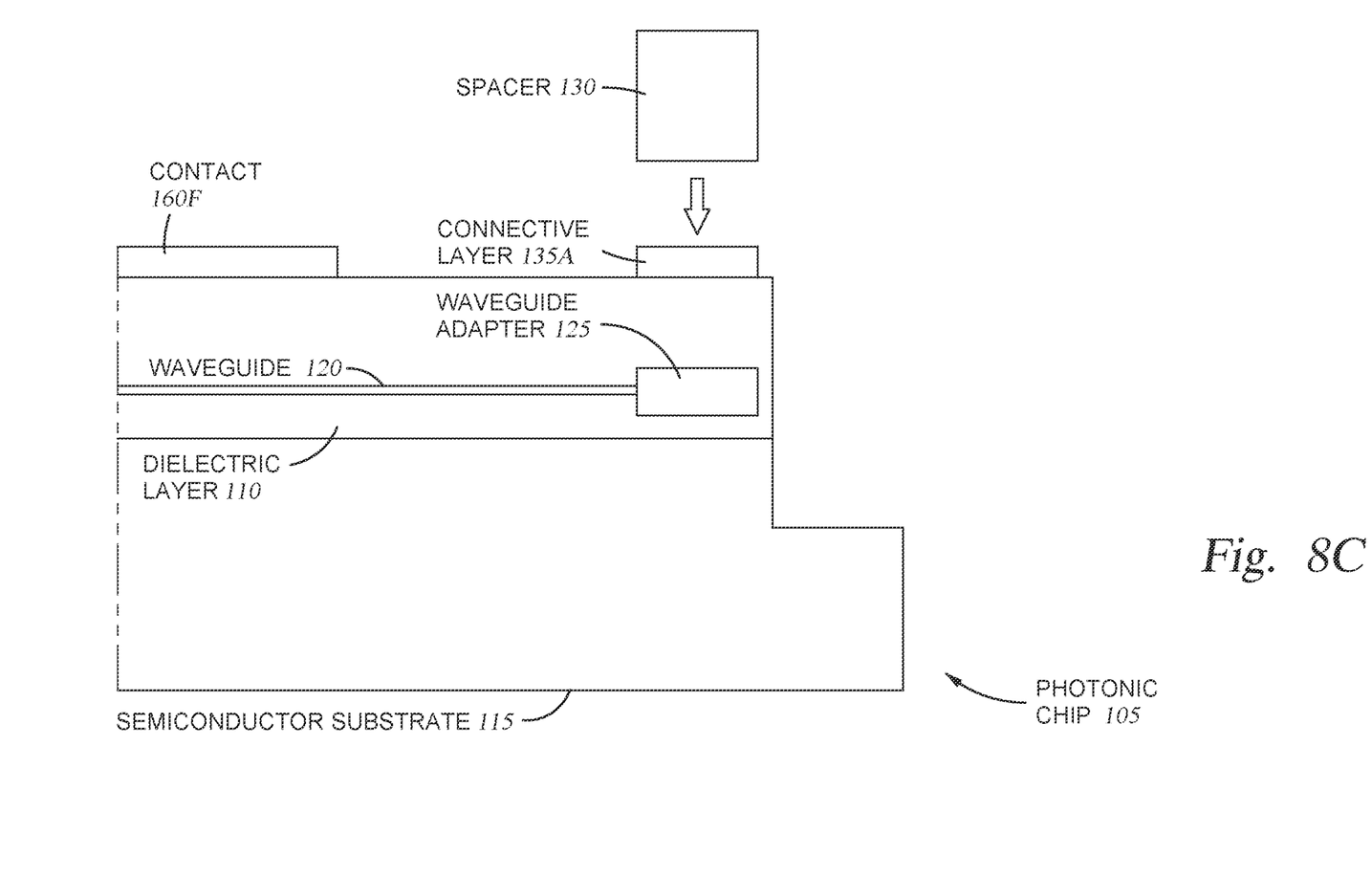

Assuming the laser is functional, at block 720 a spacer is attached to a first side of a photonic chip. As shown in FIG. 8C, the spacer 130 is attached to the photonic chip 105 using the connective layer 135A. For example, if the connective layer 135A is epoxy, the spacer 130 can be disposed on uncured epoxy and then cured before the spacer is then attached to the submount. However, in another embodiment, the epoxy in the layer 135A may remain uncured until after the spacer 130 is attached to the submount.

Figure 8D:
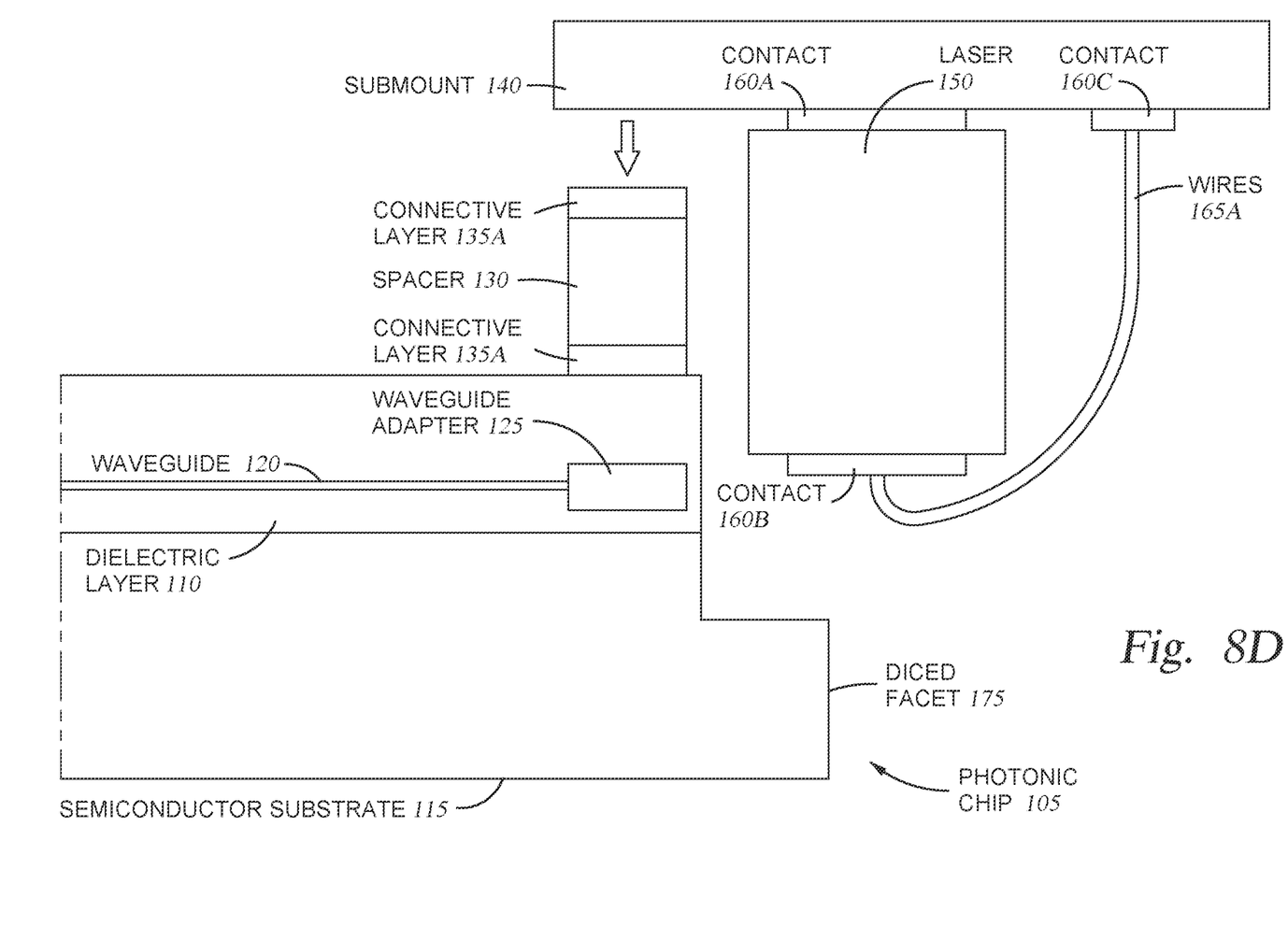
Figure 8E:
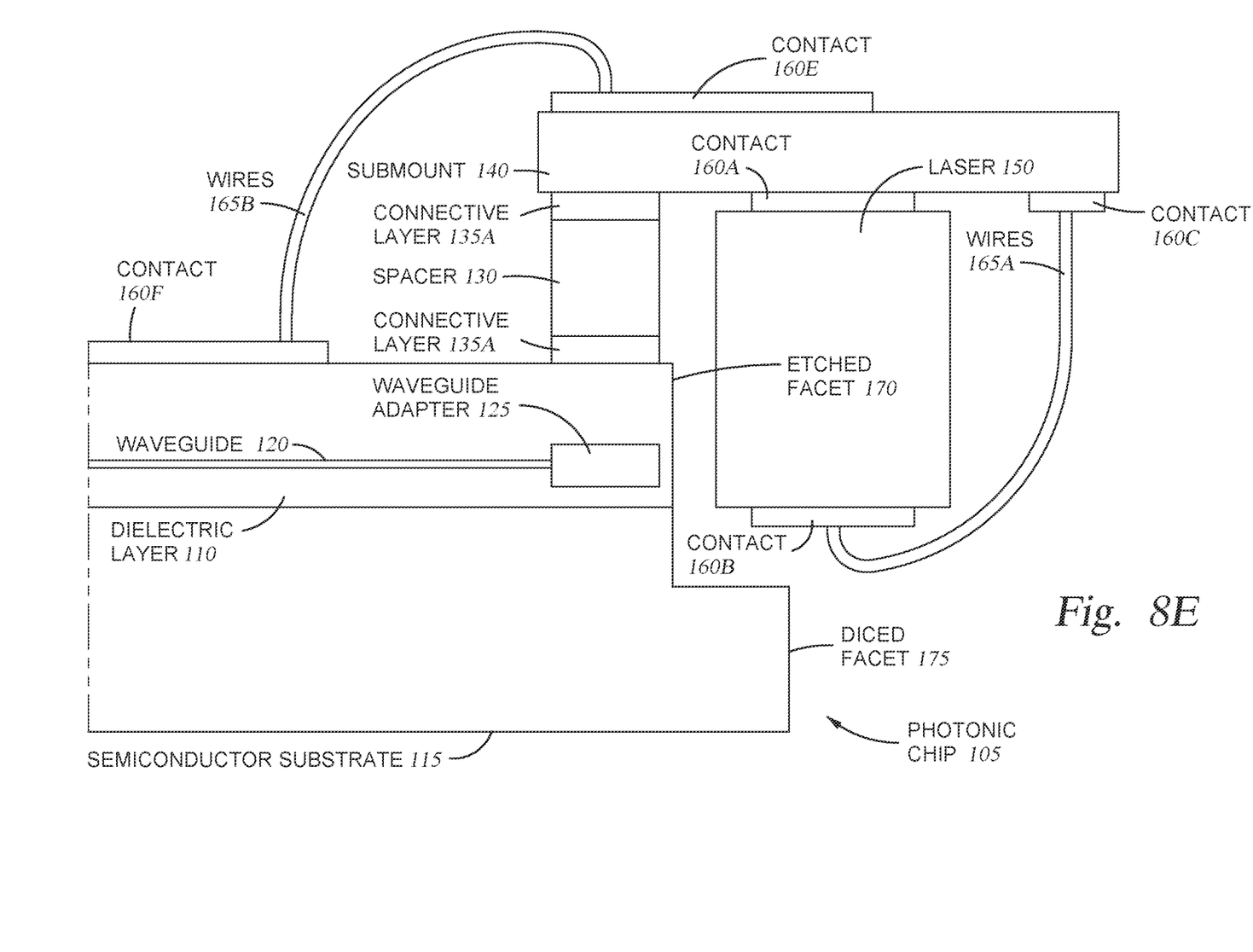

At block 725, a second side of the spacer (opposite the first side) is attached to the submount. As shown in FIG. 8D, a connective layer 135B (e.g., epoxy or solder balls) are applied to the second side of the spacer 130 that is opposite the first side of the spacer 130 connected to the layer 135A. However, in another embodiment, the connective layer 135B may instead be applied to the submount 140. In either case, the submount 140 is attached to the second side of the spacer 130 using the connective layer 135B.

In one embodiment, before curing the epoxy or when reflowing the solder in the connective layer 135B, one or more alignment steps (e.g., active alignment steps) are performed to align the laser 150 with the waveguide elements (e.g., the waveguide adapter) in the photonic chip 105. However, in other embodiments, the laser 150 may be aligned using only passive alignment steps. For example, if the laser 150 and the photonic chip 105 includes the receptacles 655 and pillars 660 illustrated in FIG. 6, active alignment may not be used. Further, if multiple spacers 130 are used (rather than just one as shown in FIG. 8D), active alignment may not be used. However, in other embodiments, even when the receptacles 655, pillars 660, and multiple spacers 130 are used, active alignment steps may be used to align the laser 150 and the photonic chip 105 when at least one (but possibly both) of the connective layers 135 is in an liquid state (e.g., uncured epoxy or when solder has been melted).

At block 730, the power rails in the submount are electrically connected to power sources. In the example shown in FIG. 8E, the contact 160E (as well as other contacts not shown) is wire bonded to the contact 160F (and potentially other contacts) on the photonic chip 105 using the wires 165B. The contact 160F, in turn, can be electrically connected to a laser driver (e.g., a power source) which generates the power for the laser 150. In one embodiment, the laser driver can be mounted on (or integrated in) the photonic chip 105. In another embodiment, the photonic chip 105 can be electrically connected (using additional wire bonds or a solder connection) to an electrical IC that includes the laser driver.

While the examples in FIGS. 8A-8D were primarily focused on assembling an optical assembly that includes a single, separate spacer, the method 700 can also be modified for any of the embodiments illustrated in FIGS. 2-6. For example, instead of attaching a single spacer at blocks 720 and 725 to the photonic chip and submount, multiple spacers can be attached during those blocks. Further, if a submount with an integrated spacer portion is used (rather than separate spacers), block 720 may be omitted since the spacer portion is already integrated into the submount. Instead, in that example, the spacer portion of the submount is attached to the photonic chip using a connective layer. A separate spacer (e.g., as shown in FIGS. 1-3) and the integrated spacer portion (e.g., as shown in FIGS. 4-5) can be collectively referred to as "spacer elements" whose thicknesses are set to align the laser such that the laser is edge coupled to photonic chip and optically aligned with the at least one waveguide in the photonic chip.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

It should be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved.

In view of the foregoing, the scope of the present disclosure is determined by the claims that follow.

I claim:

1. An optical assembly, comprising:
a photonic chip comprising at least one waveguide; and
a submount on which a laser is mounted, wherein the photonic chip comprises an etched facet creating a cavity in the photonic chip, wherein the laser is disposed within the cavity, wherein the cavity comprises at least one pillar extending in a direction towards the laser and the submount, wherein the laser comprises at least one receptacle that mates with the at least one pillar,
wherein the laser is edge coupled to the photonic chip and optically aligned with the at least one waveguide.

2. The optical assembly of claim 1, wherein the etched facet provides an optical interface configured to permit optical signals to be transferred between the laser and the at least one waveguide.

3. The optical assembly of claim 1, wherein the laser includes a first electrical connection to the submount via a first contact disposed between the laser and the submount and a second electrical connection to the submount via a wire bond between a side of the laser in a facing relationship with the at least one pillar and a second contact on the submount.

4. The optical assembly of claim 3, wherein the first and second contacts are configured to power the laser.

5. The optical assembly of claim 1, wherein the cavity comprises at least two pillars extending in a direction towards the laser and the submount, wherein the laser comprises at least two receptacles that mate with the at least two pillars.

6. The optical assembly of claim 1, further comprising:
a spacer attached to the photonic chip on a first side of the spacer and to the submount on a second side of the spacer, wherein a thickness of the spacer and a height of the at least one pillar align the laser to the at least one waveguide.

7. The optical assembly of claim 1, wherein the submount comprises a spacer portion having a thickness between a surface of the submount on which the laser is mounted and the photonic chip, wherein the spacer portion is attached to the photonic chip.

8. An optical assembly, comprising:
a photonic chip comprising at least one waveguide; and
a submount on which a laser is mounted, wherein the photonic chip defines a cavity in which the photonic chip is disposed, wherein the at least one waveguide terminates proximate to an etched facet of the cavity, wherein the cavity comprises at least one pillar extending in a direction towards the laser and the submount, wherein the laser comprises at least one receptacle that mates with the at least one pillar,
wherein the laser is edge coupled to the photonic chip and optically aligned with the at least one waveguide.

9. The optical assembly of claim 8, wherein the etched facet provides an optical interface configured to permit optical signals to be transferred between the laser and the at least one waveguide.

10. The optical assembly of claim 8, wherein the laser includes a first electrical connection to the submount via a first contact disposed between the laser and the submount and a second electrical connection to the submount via a wire bond between a side of the laser in a facing relationship with the at least one pillar and a second contact on the submount.

11. The optical assembly of claim 10, wherein the first and second contacts are configured to power the laser.

12. The optical assembly of claim 8, wherein the cavity comprises at least two pillars extending in a direction towards the laser and the submount, wherein the laser comprises at least two receptacles that mate with the at least two pillars.

13. The optical assembly of claim 8, further comprising:
a spacer attached to the photonic chip on a first side of the spacer and to the submount on a second side of the spacer, wherein a thickness of the spacer and a height of the at least one pillar align the laser to the at least one waveguide.

14. The optical assembly of claim 8, wherein the submount comprises a spacer portion having a thickness between a surface of the submount on which the laser is mounted and the photonic chip, wherein the spacer portion is attached to the photonic chip.

15. A method, comprising:
attaching a laser to a first side of a submount;
electrically connecting the laser to power rails on the submount; and
attaching the submount to a photonic chip using at least one pillar in a cavity defined by the photonic chip, wherein the laser comprises at least one receptacle that mates with the at least one pillar, and wherein the laser is edge coupled to the photonic chip and optically aligned with at least one waveguide in the photonic chip.

16. The method of claim 15, further comprising:
testing the laser after electrically connecting the laser to the power rails but before attaching the submount to the photonic chip.

17. The method of claim 15, wherein attaching the submount to the photonic chip further comprises:

using a spacer element that extends away from the first side of the submount, wherein the spacer element is a spacer separate from the submount, wherein using the spacer element comprises:

attaching a first side of the spacer to the photonic chip; and attaching a second side of the spacer to the submount, wherein the spacer is attached to the first side of the submount.

18. The method of claim 15, wherein attaching the submount to the photonic chip further comprises:

using a spacer element, wherein the spacer element is a spacer portion integrated into the submount and extends in a direction away from the first side of the submount on which the laser is mounted and towards the photonic chip, wherein using the spacer element comprises:

attaching the spacer portion to the photonic chip.

19. The method of claim 15, wherein electrically connecting the laser to the power rails on the submount comprises:

forming a first electrical connection between the laser to the submount via a first contact disposed between the laser and the submount; and forming a second electrical connection between the laser to the submount via a wire bond connected to a side of the laser in a facing relationship with the at least one pillar and a second contact on the submount.

20. The method of claim 15, wherein the cavity comprises at least two pillars extending in a direction towards the laser and the submount, wherein the laser comprises at least two receptacles that mate with the at least two pillars.

* * * * *

UNITED STATES PATENT AND TRADEMARK OFFICE
CERTIFICATE OF CORRECTION

| | |
|---|---|
| PATENT NO. | : 11,668,886 B2 |
| APPLICATION NO. | : 17/454918 |
| DATED | : June 6, 2023 |
| INVENTOR(S) | : Jock T. Bovington |

It is certified that error appears in the above-identified patent and that said Letters Patent is hereby corrected as shown below:

In the Specification

In Column 8, Line 43, delete "1608" and insert -- 160B --.

In Column 10, Line 12, delete "1358" and insert -- 135B --.

Signed and Sealed this
Twenty-ninth Day of August, 2023

Katherine Kelly Vidal
*Director of the United States Patent and Trademark Office*